(12) United States Patent
Kim (10) Patent No.: US 8,582,667 B2
(45) Date of Patent: Nov. 12, 2013

(54) TRANSMITTER FOR AUTOMATICALLY DETECTING POWER-DOWN OF RECEIVER AND SYSTEM INCLUDING THE SAME

(75) Inventor: Ho Young Kim, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 368 days.

(21) Appl. No.: 13/012,327

(22) Filed: Jan. 24, 2011

(65) Prior Publication Data

US 2011/0194628 A1    Aug. 11, 2011

(30) Foreign Application Priority Data

Feb. 10, 2010  (KR) .................. 10-2010-0012481

(51) Int. Cl.
*H04B 3/00* (2006.01)
*H04L 25/00* (2006.01)
*G06G 3/00* (2006.01)

(52) U.S. Cl.
USPC .............. 375/257; 375/260; 375/295; 710/17

(58) Field of Classification Search
USPC .............. 375/257, 259, 260, 295; 710/17, 36
See application file for complete search history.

(56) References Cited

U.S. PATENT DOCUMENTS

| | | | |
|---|---|---|---|
| 7,259,589 B1* | 8/2007 | Hui et al. | 326/63 |
| 2007/0074241 A1* | 3/2007 | Yeo | 725/31 |
| 2008/0068504 A1* | 3/2008 | Shimizu | 348/565 |
| 2008/0116943 A1* | 5/2008 | Nair | 327/108 |
| 2008/0152023 A1* | 6/2008 | Yoshida et al. | 375/257 |
| 2010/0156477 A1* | 6/2010 | Chellappa | 327/143 |
| 2011/0291817 A1* | 12/2011 | Maegaki et al. | 340/12.22 |

* cited by examiner

*Primary Examiner* — David B Lugo
(74) *Attorney, Agent, or Firm* — Lee & Morse, P.C.

(57) ABSTRACT

A transmitter of a transition minimized differential signaling (TMDS) system includes a current source, a pair of switches configured to be connected to the current source and switch a current of the current source, and a monitoring unit configured to monitor a potential of a connection node between the current source and the pair of switches. The pair of switches is connected to a receiver of the TMDS system through a first line and a second line, respectively. The monitoring unit monitors the potential of the connection node based on a power supply voltage applied to the receiver and current switching of the pair of switches.

20 Claims, 5 Drawing Sheets

TRANSMITTER FOR AUTOMATICALLY DETECTING POWER-DOWN OF RECEIVER AND SYSTEM INCLUDING THE SAME

BACKGROUND

1. Field

Embodiments relate to a transmitter using digital interface such as high-definition multimedia interface (HDMI) or digital visual interface (DVI) and a system including the same, and more particularly, to a transmitter for automatically detecting the power-down of a receiver by sensing a voltage of a predetermined node and a system including the same.

2. Description of the Related Art

Recently, audio visual (AV) systems including a source device transmitting AV data, a sink device receiving the data, and a repeater device are being developed. Examples of the source device include a digital video disc (DVD) player, a Blu-ray disc (BD) player, a high-definition (HD) DVD player, a compact disc (CD) player. Examples of the sink device include a liquid crystal display (LCD) device, a plasma display panel (PDP) device, and a projector. The repeater device may be an AV amplifier or an AV receiver.

These devices are connected to one other through HDMI cables and transmit and/or receive AV data through digital interface such as HDMI. When a source device is connected with a sink device, the source device transmits video signals to the sink device and uses a hot plug detect (HPD) signal to determine whether the sink device has been connected. However, only the connection or disconnection of the sink device is recognized, but whether the sink device has been powered down is not reliably recognized.

SUMMARY

One or more features described herein may provide a transmitter adapted to automatically detect whether a sink device is in a power-down state and a system including the same.

One or more features described herein may provide a method of transmitting a TMDS signal, the method including detecting whether a sink device is in a power-down state by monitoring a potential of a connection node connected to a TMDS receiver through a switch and a signal line when an HPD signal is sensed.

One or more features described herein may provide a transmitter adapted to detect a power-down of a receiver by monitoring a voltage of a particular node inside a transmitter and a system including the same.

One or more features described herein may provide a transmitter adapted to detect a power-down of the receiver without lag and a system including the same.

One or more features described herein may provide a transmitter and a system that may easily pass a SimplayHD compatibility test for testing high-bandwidth digital content protection (HDCP) functionality in conjunction with HDMI, thereby enabling compatibility between certified HDMI devices.

One or more features may provide a transmitter of a transition minimized differential signaling (TMDS) system, including a current source, a pair of switches configured to be connected to the current source and switch a current of the current source, and a monitoring unit configured to monitor a potential of a connection node between the current source and the pair of switches, wherein the pair of switches is connected to a receiver of the TMDS system through a first line and a second line, respectively, and the monitoring unit monitors the potential of the connection node based on a power supply voltage applied to the receiver and a respective current through the pair of switches.

The transmitter may include a buffer positioned between the connection node and the monitoring unit, the buffer being adapted to buffer and output the potential of the connection node to the monitoring unit.

The transmitter may include a current mirror, the current mirror including a first branch including a first transistor and a second transistor, and a second branch including a third transistor and a fourth transistor, wherein the current mirror may be positioned between the connection node and the monitoring unit and is adapted to output to the monitoring unit a potential appearing at a drain of the third transistor based on the potential of the connection node input to a gate of the first transistor.

The first and third transistors may be n-type metal-oxide-semiconductor field-effect transistors (MOSFETs) and the second and fourth transistors are p-type MOSFETs.

When one switch of the pair of switches is closed, the other is open.

The transmitter may be employed in a transition minimized differential signaling (TMDS) system.

The TMDS system may be powered on by a power supply voltage and a ground supply voltage.

One or more features may be provide a transition minimized differential signaling (TMDS) system, including a transmitter as described above and a receiver including at least one pull-up resistor connected between a power supply voltage and one of the first and second lines.

The receiver may be connected with the first line and the second line and further includes a comparator configured to compare a potential of the first line with a potential of the second line.

The TMDS system may be employed in an audio visual (AV) system.

When the potential of the connection node is represented by $V_A$, and $V_A = Vcc - I \times R_T - I \times R_{ON,SW}$, where Vcc is the power supply voltage, "I" is the current of the current source, $R_T$ is a pull-up resistance of the at least one pull-up resistor, and $R_{ON,SW}$ is a resistance when the pair of switches is turned on.

One or more features may provide a method of transmitting a transition minimized differential signaling (TMDS) signal from a TMDS transmitter to a TMDS receiver, the method including sensing a hot plug detect (HPD) signal received from the TMDS receiver, monitoring a potential of a connection node connected to the TMDS receiver through a switch and a signal line when the HPD signal is sensed, and transmitting the TMDS signal to the TMDS receiver when a particular potential is detected.

The method may further include determining whether a reset signal is received before the operation of sensing the HPD signal.

Sensing of the HPD signal may include sensing the HPD signal when it is determined that the reset signal is not received.

Monitoring the potential of the connection node may include monitoring the potential after being buffered by a buffer connected to the connection node.

Monitoring the potential of the connection node may include monitoring the potential of the connection node through a current mirror connected to the connection node.

The current mirror may include at least one n-type metal-oxide-semiconductor field-effect transistor (MOSFET) and at least one p-type MOSFET.

The method may include determining whether the receiver has an HDMI function based on information stored a memory of the receiver.

Transmitting the TMDS signal may include transmitting the TMDS signal in a high-definition multimedia interface (HDMI) format.

Transmitting the TMDS signal may include transmitting the TMDS signal in a digital visual interface (DVI) format.

BRIEF DESCRIPTION OF THE DRAWINGS

Features will become more apparent to those of ordinary skill in the art by describing in detail exemplary embodiments with reference to the attached drawings, in which.

DETAILED DESCRIPTION

Korean Patent Application No. 10-2010-0012481, filed on Feb. 10, 2010, in the Korean Intellectual Property Office, and entitled: "Transmitter for Automatically Detecting Power-Down of Receiver and System Including the Same," is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout the specification.

In addition, it will also be understood that when an element is referred to as being "connected" to another element, unless specified otherwise, it may be directly connected to the another element, or one or more intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
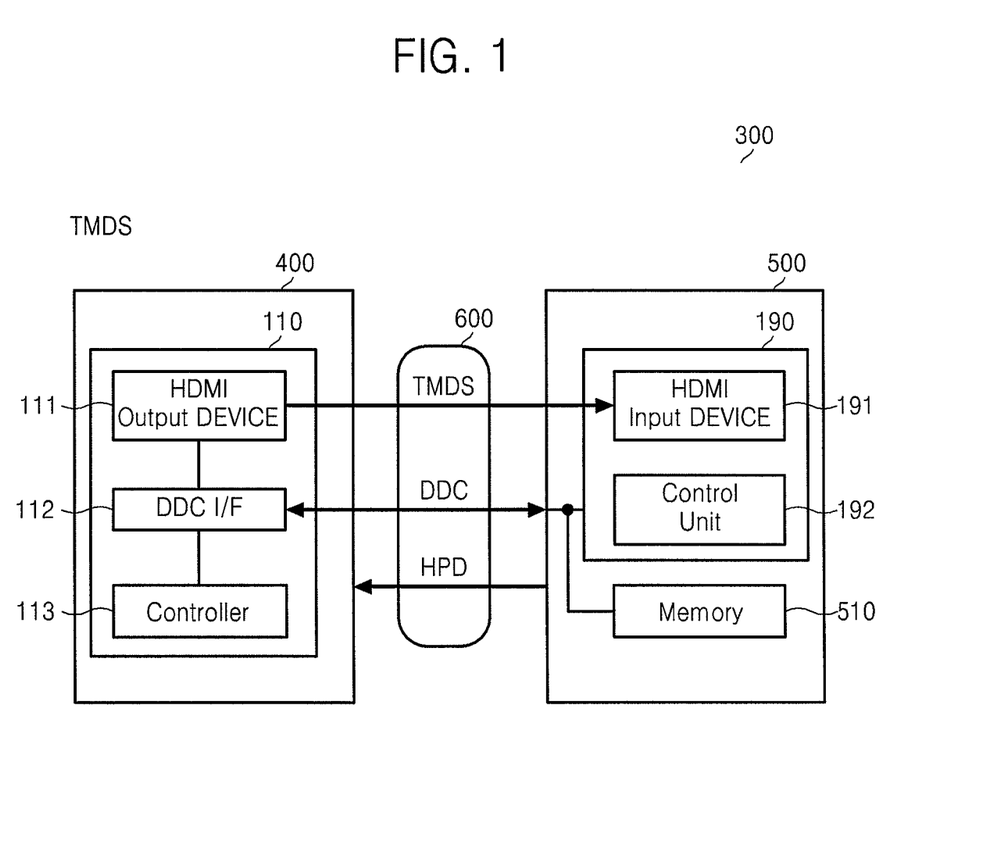
FIG. 1 illustrates a block diagram of an exemplary embodiment of an audio visual (AV) system.

FIG. 1 illustrates a block diagram of an exemplary embodiment of an audio visual (AV) system 300. The AV system 300 may include a video transmitting device 400, a video receiving device 500, and an interface (I/F) 600.

The video transmitting device 400 may include a transmitter 110. The video receiving device 500 may include a receiver 190 and a memory 510. The I/F 600 may include high-definition multimedia interface (HDMI) and digital visual interface (DVI). Signals transmitted by the I/F 600 may include a display data channel (DDC) signal, a hot plug detect (HPD), a transition minimized differential signaling (TMDS) signal, and a clock signal (not shown). The TMDS signal may be a high-speed video and/or audio signal. The clock signal may be generated by a power supply voltage (e.g., 3.3 V).

The transmitter 110 may include an HDMI output device 111, a DDC I/F 112, and a controller 113. The receiver 190 may include an HDMI input device 191 and a control unit 192.

The HDMI output device 111 may convert an AV signal into a TMDS signal. The HDMI output device 111 may output the TMDS signal to the HDMI input device 191 of the receiver 190. The controller 113 may control the transmitter 110. For instance, the controller 113 may output a control signal to control the signal conversion of the HDMI output device 111 and may control an impedance of an output of the DDC I/F 112 to be low or high. The DDC I/F 112 may enable the transmitter 110 and the receiver 190 to perform DDC communication and/or may transmit various control signals generated by the controller 113 to control the transmitter 110.

The HDMI input device 191 may receive the TMDS signal. The control unit 192 may transmit and receive DDC signals to and from the transmitter 110 through the I/F 600. A DDC signal may include a DDC data signal and a 5V direct current (DC) signal.

The control unit 192 may control the HPD signal using the DDC signal. For instance, when an abnormal current is not detected, e.g., no abnormal current, in the video receiving device 500, the control unit 192 may control the HPD signal at a high level, e.g., a 5V DC, signal to be transmitted to the video transmitting device 400. When an abnormal current, e.g., at least some abnormal current, is detected in the video receiving device 500, the control unit 192 may control the HPD signal at a low level, e.g., a 0V DC signal to be transmitted to the video transmitting device 400. Here, the HPD signal enables an interface cable to be plugged in and out while the video receiving device 500 is being powered on.

The memory 510 may store extended display identification data (EDID) information. When the video receiving device 500 is a monitor, the EDID information may correspond to monitor information (e.g., a standard display variable, a display characteristic, and an available resolution and a horizontal or vertical frequency of the monitor). The EDID information may be embedded in the DDC signal when it is transmitted to the transmitter 110.

Figure 2:
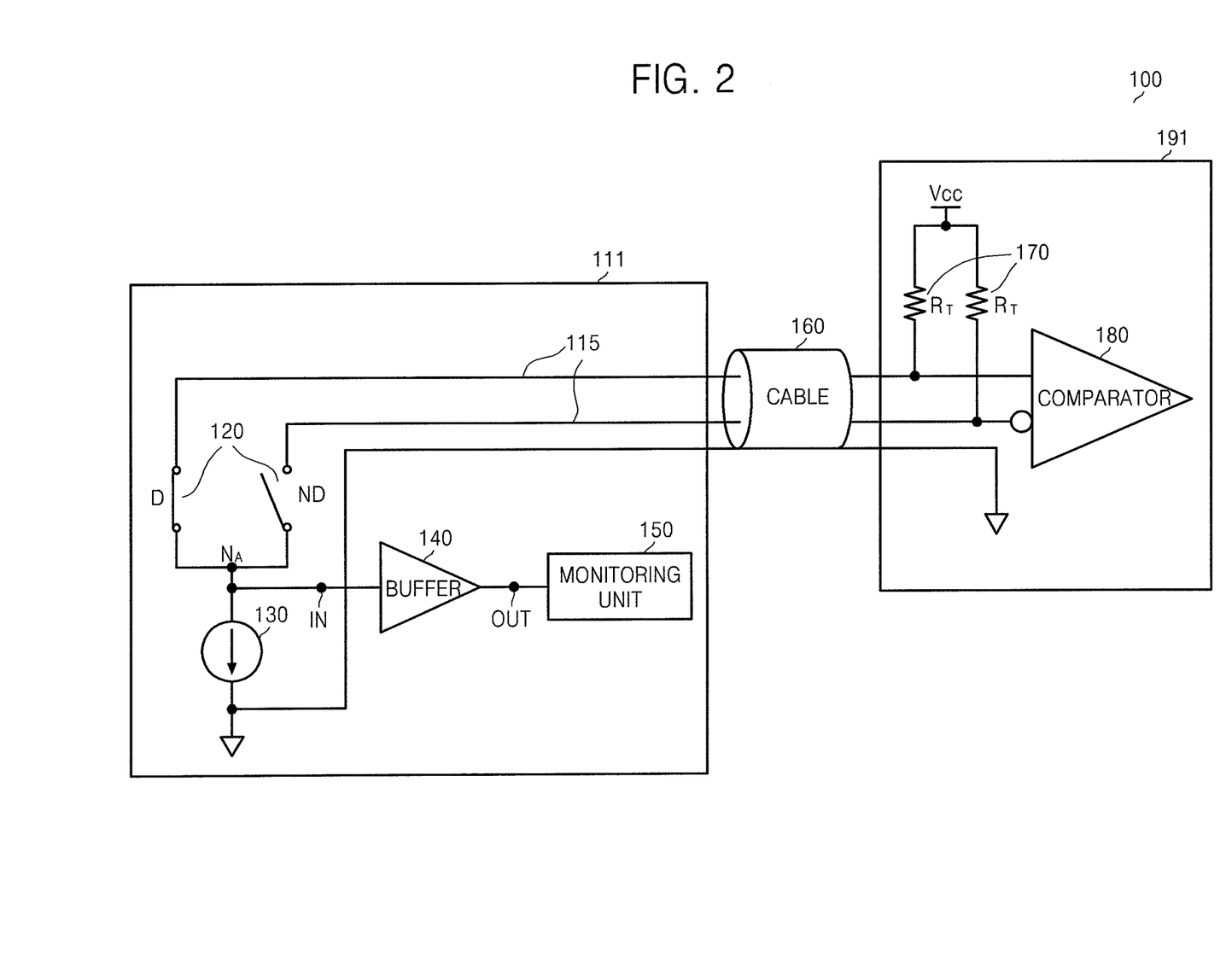
FIG. 2 illustrates a schematic diagram of an exemplary embodiment of a transition minimized differential signaling (TMDS) system.

FIG. 2 illustrates a schematic diagram of an exemplary embodiment of a TMDS system 100. The TMDS system 100 may generate, e.g., convert an AV signal into a TMDS, and/or may transmit the transmission of the TMDS signal illustrated in FIG. 1.

Referring to FIG. 2, the TMDS system 100 may include the HDMI output device 111 included in the transmitter 110 and the HDMI input device 191 included in the receiver 190. Differential lines 115 may be connected between the HDMI output device 111 and the HDMI input device 191 through a cable 160. The cable 160 may include at least one wire or sheath connecting the HDMI output device 111 and the HDMI input device 191 to a ground voltage.

The HDMI output device 111 may switch a current of a current source 130 between the complementary differential lines 115 using a switch pair 120, e.g., switches D and ND. The HDMI output device 111 may also include a buffer 140 and a monitoring unit 150. The buffer 140 may buffer and output a potential of a connection node $N_A$ between the current source 130 and the switch pair 120. The monitoring unit 150 may monitor the potential output from the buffer 140.

The HDMI input device 191 may include a comparator 180 and at least one pull-up resistor $R_T$ 170. The comparator 180 may compare potentials of the differential lines with each other. The at least one pull-up resistor 170 may bias the differential lines 115 to a power supply voltage Vcc (e.g., 3.3. V). The cable 160 and the at least one pull-up resistor 170 may have a matching impedance. For example, the cable 160 and the pull-up resistor 170 may have a matching impedance of, e.g., 50Ω.

Figure 4:
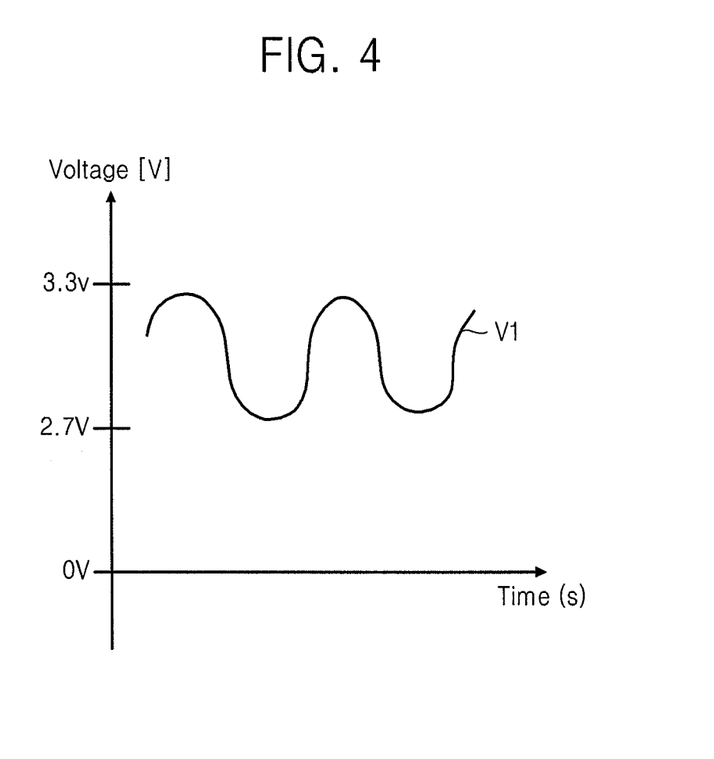
FIG. 4 illustrates a diagram showing an exemplary voltage swing on differential lines according to some embodiments.

The HDMI output device 111 and the HDMI input device 191 may be driven by the power supply voltage Vcc. A voltage swing on the differential lines 155 may correspond to the exemplary voltage swing diagramed in FIG. 4. Referring to FIG. 4, a width of the voltage swing may be about 500 mV.

When the power supply voltage Vcc is applied and the HDMI input device 191 (or the receiver 190) is powered on, a particular potential may appear at the connection node $N_A$. A potential $V_A$ of the connection node $N_A$ is expressed by Equation 1:

$$V_A = Vcc - I \times R_T - I \times R_{ON,SW}$$ [Equation 1].

In Equation 1, $R_{ON,SW}$ is a resistance when the switch pair 120 is turned on. "I" is a current flowing to the connection node $N_A$ from the power supply voltage Vcc, that is, "I" is the current of the current source 130. For instance, when Vcc=3.3 V, $R_T$=50Ω, $R_{ON,SW}$=10Ω, and I=5 mA, the potential $V_A$ is calculated by $V_A$=3.3−0.005×50−0.005×5=3 V.

The monitoring unit 150 may monitor a potential of the connection node $N_A$. The monitoring unit 150 may determine that the HDMI input device 191 (or the receiver 190) is powered on when the potential $V_A$ of the connection node $N_A$ is 3V.

Figure 3A:
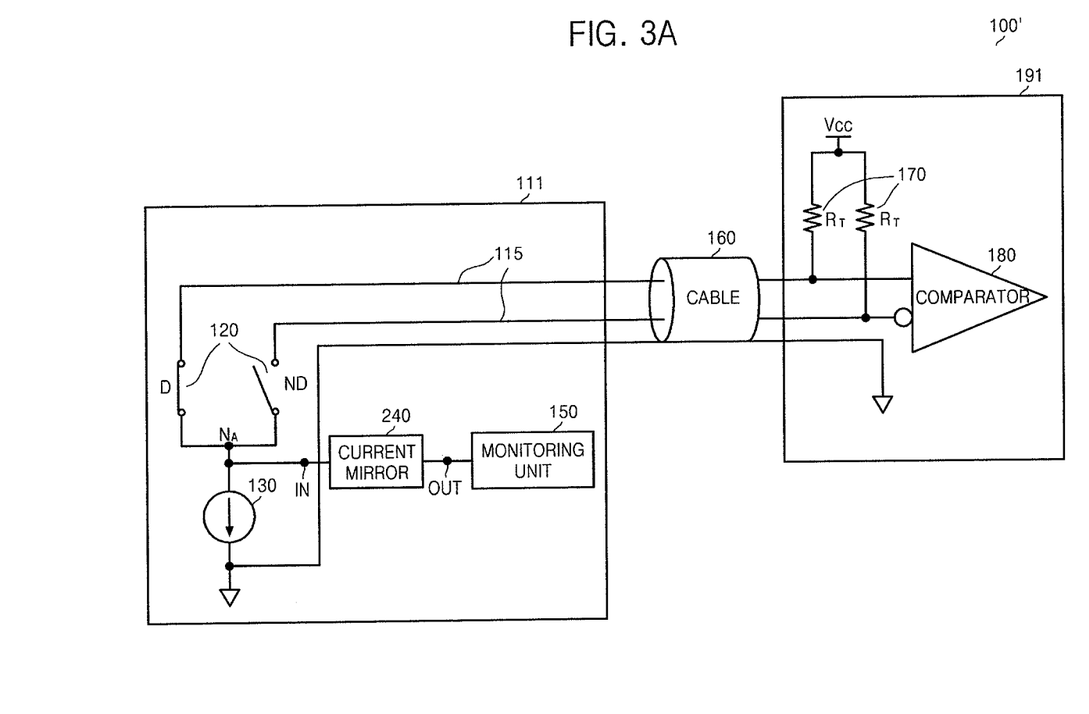
FIG. 3A illustrates a schematic diagram of another exemplary embodiment of a TMDS system.
Figure 3B:
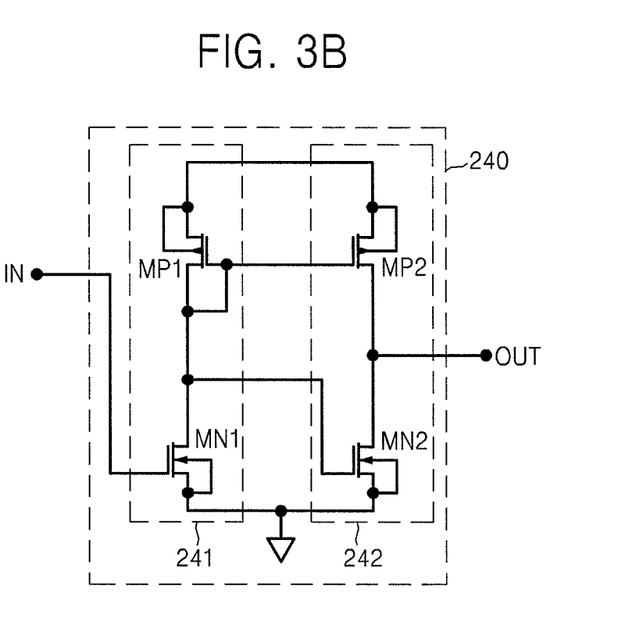
FIG. 3B illustrates a circuit diagram of an exemplary embodiment of the current mirror illustrated in FIG. 3A.

FIG. 3A illustrates a schematic diagram of another exemplary embodiment of a TMDS system 100'. FIG. 3B illustrates a circuit diagram of an exemplary embodiment of a current mirror 240 illustrated in FIG. 3A. In general, only differences between the exemplary embodiment of the TMDS system 100 of FIG. 2 and the exemplary TMDS system 100' of FIG. 3A will be described. Referring to FIGS. 3A and 3B, the TMDS system 100' may include the current mirror 240 instead of the buffer 140 included in the exemplary TMDS system 100 illustrated in FIG. 2.

The current mirror 240 may include a first branch 241 and a second branch 242. The first branch 241 may include a first transistor MN1 and a second transistor MP1. The second branch 242 may include a third transistor MN2 and a fourth transistor MP2.

When the power supply voltage Vcc is applied and the HDMI input device 191 (or the receiver 190) is powered on, a potential $V_A$ of the connection node $N_A$ may correspond to Equation 1. A predetermined potential $V_A$ may be applied to a gate of the first transistor MN1. A current may flow in the first branch 241 of the current mirror 240. Accordingly, a same current as the first branch 241 flows in the second branch 242.

The monitoring unit 150 may monitor a potential at a drain of the third transistor MN2 according to the current flowing in the second branch 242. When the monitoring unit 150 determines that the predetermined potential appears at the drain of the third transistor MN2, this means that the HDMI input device 191 (or the receiver 190) is powered on.

FIG. 4 illustrates a diagram showing an exemplary voltage swing V1 on the differential lines 115. Referring to FIGS. 1 through 3, the transmitter 110 and the receiver 190 may be driven by the power supply voltage Vcc. Referring to FIG. 4, a voltage V1 on the differential lines 115 may swing from about 2.7 V to about 3.3 V.

Figure 5:
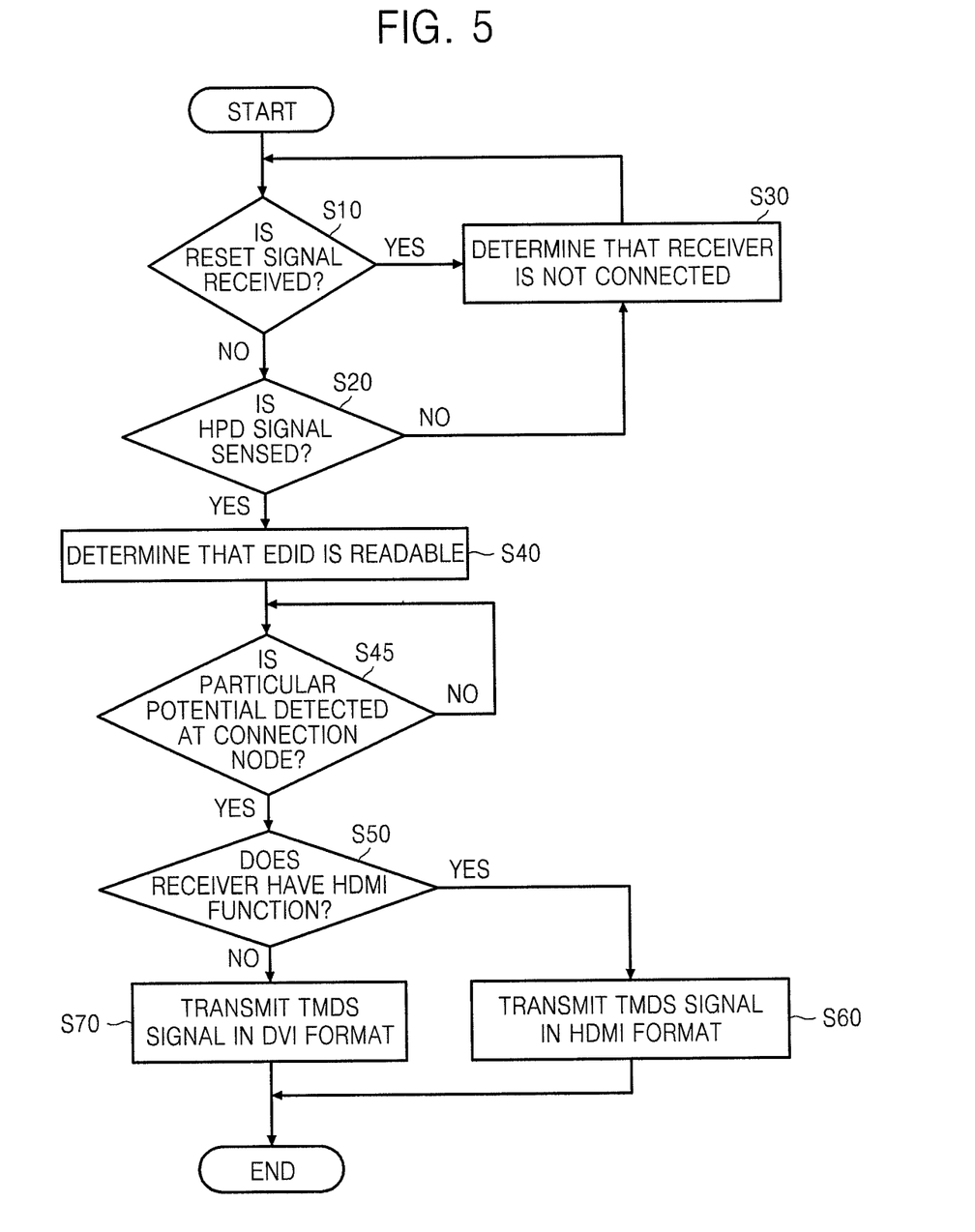
FIG. 5 illustrates a flowchart of an exemplary embodiment of a method of transmitting a TMDS signal.

FIG. 5 illustrates a flowchart of an exemplary embodiment of a method of transmitting a TMDS signal. The method may be performed by the transmitter 110 illustrated in FIG. 1. When the transmitter 110 is about to transmit a TMDS signal to the receiver 190, during S10, the transmitter 110 may determine whether an external or internal reset signal is received.

If it is determined that an external or internal reset signal has been received, during S30, the transmitter 110 may determine that the receiver 190 is not connected.

If it is determined that an external or internal reset signal has not been received, during S20, the transmitter 110 may sense an HPD signal received from the receiver 190. When the HPD signal is not sensed, the transmitter 110 may determine that the receiver 190 is not connected and re-start via S30. When the HPD signal is sensed, during S40, the transmitter 110 may determine that EDID information is readable. At this time, the transmitter 110 may prepare to transmit the TMDS signal.

To determine whether the receiver 190 has been powered on before transmitting the TMDS signal, during S45, the transmitter 110 may determine whether a particular potential is detected at the connection node $N_A$. When the particular potential is detected, during S50, the transmitter 110 may determine whether the receiver 190 has an HDMI function based on the EDID information stored in the memory 510. At this time, the transmitter 110 may determine the existence or non-existence of the HDMI function in order to decide whether to transmit the TMDS signal in an HDMI format or a DVI format to the receiver 190.

When it is determined that the receiver 190 has the HDMI function, during S60, the transmitter 110 may transmit the TMDS signal in the HDMI format to the receiver 190. When it is determined that the receiver 190 does not have the HDMI function, during S70, the transmitter 110 may transmit the TMDS signal in the DVI format to the receiver 190.

While display data channel (DDC) communication may be used to reliably detect the power-down of a sink device, DDC communication may be slow and/or many receivers do not respond to DDC if a TMDS signal has not been received in advance. More particularly, DDC communication is generally very slow with a maximum speed of 100 kHz, so it can take long for a power-on signal to reach a source device from a sink device. Accordingly, a source device, i.e., a transmitter may likely to conclude that a sink device i.e., a receiver is in a power-down state and terminate transmission of a transition minimized differential signaling (TMDS) signal. Further, many receivers do no respond to DDC if a TMDS signal has not been received in advance. Such receivers cannot perform DDC communication itself, and therefore, transmitters cannot recognize whether the receivers are in the power-down state.

In embodiments, power-down of a receiver may be automatically recognized by monitoring a voltage of a particular node inside a transmitter. In addition, the power-down of the receiver may be recognized immediately without lag. Moreover, the transmitter and a system including one or more features described above may easily pass a SimplayHD compatibility test for testing high-bandwidth digital content protection (HDCP) functionality in conjunction with HDMI, thereby easily solving a compatibility problem between certified HDMI devices.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A transmitter of a transition minimized differential signaling (TMDS) system, the transmitter comprising:
   a current source;
   a pair of switches configured to be connected to the current source and switch a current of the current source; and
   a monitoring unit configured to monitor a potential of a connection node between the current source and the pair of switches, wherein the pair of switches is connected to a receiver of the TMDS system through a first line and a second line, respectively, and the monitoring unit monitors a potential of the connection node based on a power supply voltage of the receiver and a current through one or both of the pair of switches, wherein the monitoring unit determines:
   whether the potential is in a first range when the receiver of the TMDS system is in a first power state, the potential in the first range based on the power supply voltage and a voltage drop across one or both of the pair of switches, and
   whether the potential is in a second range different from the first range when the receiver of the TMDS system is in a second power state different from the first power state.

2. The transmitter as claimed in claim 1, further comprising a buffer positioned between the connection node and the monitoring unit, the buffer to buffer and output information indicative of the potential of the connection node to the monitoring unit.

3. The transmitter as claimed in claim 1, further comprising a current mirror,
   the current mirror including a first branch including a first transistor and a second transistor, and a second branch including a third transistor and a fourth transistor,
   wherein the current mirror is positioned between the connection node and the monitoring unit and is to output to the monitoring unit a potential appearing at a drain of the third transistor based on the potential of the connection node input to a gate of the first transistor.

4. The transmitter as claimed in claim 3, wherein the first and third transistors are n-type metal-oxide-semiconductor field-effect transistors (MOSFETs) and the second and fourth transistors are p-type MOSFETs.

5. The transmitter as claimed in claim 1, wherein when one switch of the pair of switches is closed, the other is open.

6. The transmitter as claimed in claim 1, wherein the TMDS system is powered on by a power supply voltage and a ground supply voltage.

7. A transition minimized differential signaling (TMDS) system, comprising:
   a transmitter as claimed in claim 1 and a receiver including at least one pull-up resistor connected between a power supply voltage and one of the first and second lines.

8. The TMDS system as claimed in claim 7, wherein the receiver is connected with the first line and the second line and further includes a comparator configured to compare a potential of the first line with a potential of the second line.

9. An audio visual (AV) system comprising the TMDS system as claimed in claim 7.

10. The TMDS system as claimed in claim 7, wherein when the potential of the connection node is in the first range when the potential is represented by $V_A$, and $V_A = Vcc - I \times R_T - I \times R_{ON,SW}$, where Vcc is the power supply voltage, "I" is the current of the current source, $R_T$ is a pull-up resistance of the at least one pull-up resistor, and $R_{ON,SW}$ is a resistance when the pair of switches are turned on.

11. The transmitter as claimed in claim 1, wherein the first range has a maximum value greater than a maximum value of the second range.

12. The transmitter as claimed in claim 1, wherein the first power state is a power on state and wherein the second power state is a power off state.

13. The transmitter as claimed in claim 1, wherein the power supply voltage of the receiver is the only power supply voltage connected to the first and second lines.

14. The transmitter as claimed in claim 1, wherein the monitoring unit determines that the potential is in the first range or the second range before a TMDS signal is transmitted on the first line and the second line to the receiver.

15. A method of transmitting a transition minimized differential signaling (TMDS) signal from a TMDS transmitter to a TMDS receiver, the method comprising:
   sensing a hot plug detect (HPD) signal received from the TMDS receiver;
   monitoring a potential of a connection node connected to the TMDS receiver through a switch and a signal line when the HPD signal is sensed; and
   transmitting the TMDS signal to the TMDS receiver after a particular potential is detected, wherein monitoring the potential of the connection node includes:
   determining the potential is in a first range when the TMDS receiver is in a first power state, the potential in the first range based on a power supply voltage and a voltage drop across one or both of the pair of switches, and
   determining the potential is in a second range different from the first range when the TMDS receiver is in a second power state different from the first power state.

16. The method as claimed in claim 15, further comprising determining whether a reset signal is received before sensing the HPD signal.

17. The method as claimed in claim 16, wherein sensing of the HPD signal comprises sensing the HPD signal when it is determined that the reset signal is not received.

18. The method as claimed in claim 16, wherein monitoring the potential of the connection node comprises monitoring the potential after being buffered by a buffer connected to the connection node.

19. The method as claimed in claim 16, wherein monitoring the potential of the connection node comprises monitoring the potential of the connection node through a current mirror connected to the connection node.

20. The method as claimed in claim 15, further comprising determining whether the receiver has an HDMI function based on information stored in a memory of the receiver.

* * * * *